Nov. 3, 1964 W. GEBHARDT ETAL 3,154,970

PLANET CARRIER FOR PLANETARY GEAR

Filed Nov. 15, 1961

INVENTORS
Willi Gebhardt
Kurt Zerbst

By Richard ...
Agt

United States Patent Office 3,154,970
Patented Nov. 3, 1964

3,154,970
PLANET CARRIER FOR PLANETARY GEAR
Willi Gebhardt and Kurt Zerbst, both of Schweinfurt (Main), Germany, assignors to Fichtel & Sachs A.G., Schweinfurt (Main), Germany, a corporation of Germany
Filed Nov. 15, 1961, Ser. No. 166,728
4 Claims. (Cl. 74—750)

This invention relates to planetary gears, and more particularly to a planet carrier and to a method of making the same.

It is known to shape steel and other high strength metal by the application of pressure at room temperature or other temperatures substantially below the annealing temperature of the metal while the metal is at least partly confined in a die cavity. With the application of sufficient pressure, the metal flows and conforms to the contours of the confining cavity. This method, hereinafater referred to as "cold forging," yields metal objects of great structural strength. It has heretofore been applied only to the manufacture of simple shapes such as metal objects having a uniform shape. Metal flow has been limited in the known applications of this method to flow in one direction, or at most in two directions approximately perpendicular to each other. Typical examples of metal elements produced heretofore by cold forging include solid and hollow objects of uniform arcuate, and preferably circular cross section, and also similar objects the cross section of which decreases in steps in the direction of metal flow. Cold forging of steel and like metals has heretofore not been applied to the manufacture of planetary gears, and more specifically to the manufacture of planet carriers for multiple speed bicycle hubs and the like.

The planet carrier is one of the most complex elements of a planetary gear transmission, and was heretofore usually the most costly element of a planetary gear. The type of planet carrier employed in multiple speed bicycle hubs and the like generally consists of a cylindrical bearing sleeve and a flange member coaxial with the sleeve and carrying the planet wheels. Depending on the specific gear arrangement one or both of the radial flange faces may carry projections which interact with other elements of the transmission arrangement. These projections may include stub shafts on which the planet wheels are journaled, abutment members which limit or transmit movement of other transmission elements, and the like. The projections on the flange member may also constitute pivot pins for pawls of a ratchet drive.

Two methods have heretofore been employed in the manufacture of planet carriers of the afore-described type. According to the more usual method, the planet carrier with its projections is assembled from individual parts. The bearing sleeve and the flange member may be machined from an integrally cast blank whereupon the various projections which are prepared separately are inserted and secured in suitable bores of the flange member. According to the other method which leads to a mechanically stronger planet carrier at a substantial increase in cost, the planet carrier with its projection is machined as an integral unit from a solid block of metal.

It has not been possible heretofore to produce a planet carrier of truly satisfactory mechanical strength by the assembly method. Planet carriers machined in one piece are costly and have been the costliest single item in many gear assemblies where they have been employed. Yet, their mechanical properties are not fully satisfactory.

The primary object of this invention is the provision of a planet carrier for multiple speed hubs of bicycles, motor cycles, and similar applications which combines a cost substantially lower than that of the integrally machined known carriers with mechanical strength better than that of the best previously known planet carriers of similar material.

It has been found that a planet carrier satisfying these requirements can be produced by cold forging of a steel blank from which the bearing sleeve, the flange member, and the required projections on the flange member can be produced integrally and simultaneously in a single operation. When the planet carrier is intended for a bicycle or motor cycle hub equipped with a coaster brake, eccentric abutments for a brake cone or the like may be formed integrally with the flange member in axial alignment with a portion of the bearing sleeve. It has been found that abutments of circular, elliptic, and even of polygonal cross section in a radial plane may be produced by cold pressing. It is entirely feasible to produce integral eccentric pivot pins for pawls in the same manner.

Where an annular gear wheel is desired to be attached coaxially to the flange member for transmitting motion to or from the planet carrier by means of clutch elements engaging the gear wheel, axially projecting pins to which the gear wheel may be fastened can be integrally formed with the flange member. These pins may also serve as shafts on which the planet wheels of the planetary gear are journaled. In a hub arrangement for bicycles and the like disclosed in the commonly assigned United States application No. 61,335 filed on October 4, 1960, now Patent No. 3,057,227, issued October 9, 1962, such pins serve simultaneously as fastening means for an annular gear wheel and as shafts for planet wheels. The planet carrier of the afore-mentioned application has been successfully formed by cold forging according to the method of this invention. The pins are of stepped cylindrical shape. They have a portion adjacent the flange member which is of greater diameter and provides a bearing surface for a planet wheel, and a free end portion of smaller diameter to which the annular gear wheel is secured.

According to the method of the invention, a solid steel blank is placed between the two halves of a cold forging die which are then urged against each other. The bearing sleeve and those projections on the flange member which project axially from the flange member in the same direction as the bearing sleeve are formed by metal flowing into one of the die halves, whereas the projections on the opposite face of the flange member are shaped in the other die half.

The planet carriers produced by this method have been been found to have superior mechanical strength when compared with carriers formed by the afore-mentioned assembly or machining methods. The improved mechanical properties of the cold forged planet carriers are due to the anisotropic structure of the metal the flow lines of which conform to the external shape of the planet carrier. This structure is not disturbed by subsequent working in the instant method. The internal stresses are distributed in a particularly advantageous manner,, and such a stress distribution cannot be produced by assembly nor by machining of an integral structure from a solid block.

The axial passage normally required in planet carriers of the type described may be formed directly in the cold forging operation and may be finished by abrasive grinding to size. It is also possible, though less advantageous, to produce a solid cylindrical bearing sleeve by cold forging, and to subsequently bore and grind the axial passage. The bearing faces of projections which serve as bearing pins for planet wheels or pawls are preferably ground to size and polished after cold forging.

Other features and many of the attendant advantages of this invention will hereinafter become more fully apparent from the following description of the annexed drawings which illustrate preferred embodiments of the invention, and wherein.

Figure 1:
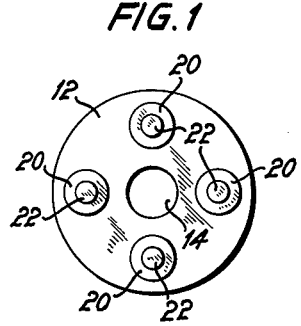
FIG. 1 shows a first embodiment of the planet carrier of the invention in front elevation.
Figure 2:
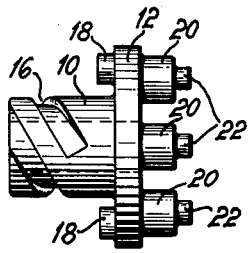
FIG. 2 shows the planet carrier of FIG. 1 in side elevation.
Figure 3:
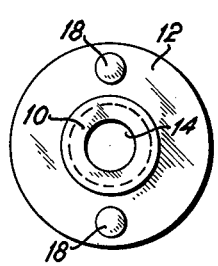
FIG. 3 is a rear view of the planet carrier of FIG. 1.

The planet carrier illustrated in FIGS. 1 to 3 is of the type disclosed in the copending commonly assigned United States application Serial Number 42,292 filed on July 12, 1960, now Patent No. 3,034,618, issued May 15, 1962, and its cooperation with other elements of a multiple speed hub for a bicycle or motor cycle has been more fully described in that application.

The planet carrier constitutes a unitary structure including a bearing sleeve 10 and a coaxial flange member 12. The bearing sleeve 10 projects from a face of the flange member 12 which for convenience of description will hereinafter be referred to as the rear face of the flange member. An axial passage of cylindrical shape is formed in the sleeve 10 and the flange member 12 and rotatably receives other hub elements in the assembled hub. A short and relatively steep double buttress thread 16 is cut into the otherwise cylindrical outer wall of the sleeve 10. A brake cone is threadedly connected to the planet carrier by the threads 14 in the hub assembly.

The rear face of the flange member is formed with two integral pin-shaped projections 18 which are arranged eccentrically and are offset by 180°. The projections 18 are of circular cross section and serve as abutments engaging corresponding abutting portions of the aforementioned brake cone as the same rotates in a helical path on the threads 14.

Four eccentric pins are symmetrically distributed about the axis of the front face of the flange member 12. The pins are of stepped cylindrical shape and consist of a base portion 20 of greater diameter adjacent the front face of the flange member 12, and of a free end portion 22 of reduced diameter which engages another motion transmitting element of the multiple speed hub in the completed assembly.

Figure 4:
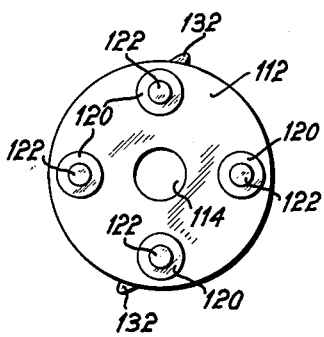
FIG. 4 illustrates another embodiment of the planet carrier of the invention in a front elevational view.
Figure 5:
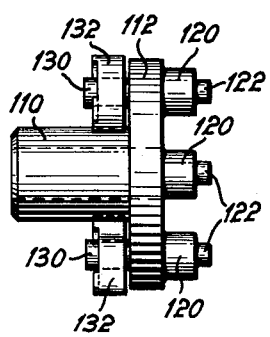
FIG. 5 is a side elevational view of the planet carrier of FIG. 4.
Figure 6:
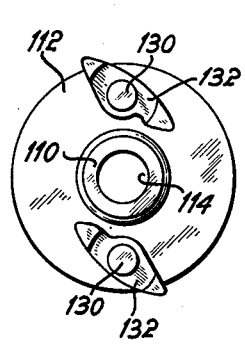
FIG. 6 shows the planet carrier of FIG. 4 in a rear view.

The planet carrier illustrated in FIGS. 4 to 6 in views corresponding to those of FIGS. 1 to 3 is of the type disclosed in the copending commonly assigned application Serial Number 61,335, filed on October 4, 1960, now Patent No. 3,057,227, issued October 9, 1962. The planet carrier shown in FIGS. 4 to 6 is similar to that described above in connection with FIGS. 1 to 3. Its major elements are a bearing sleeve 110 and a flange member 112 and are formed with a passage 114. The sleeve 110 has a plain cylindrical outer surface. The rear face of the flange member 112 carries two integral eccentric bearing pins 130 arranged on a common diameter of the flange member, and each serving as a pivot for a pawl 132. The front face of the flange member 112 carries four eccentric axially elongated pins of stepped cylindrical shape, the base portion 120 of which provides a bearing for a planet wheel (not shown), whereas the free end portions 122 of reduced diameter are adapted to engage respective portions of an annular gear wheel which is part of the motion transmitting train of the hub, as described in the fore-mentioned patent application.

The planet carriers of the invention are formed from a steel blank in a conforming die consisting of two halves and split in a plane corresponding to the rear face of the planet carrier. The blank is an axial section of a cylindrical rod. Its volume is substantially equal to the volume of the finished carrier. The blank is set into the lower die cavity, and the upper die cavity is forced against the blank, forcing the metal to flow and to fill the cavities in both die halves.

The cold forging of shapes which not only include central projections along the axis of the forged article, but also eccentric projections such as the several pins necessary in the planet carriers of the invention was heretofore considered impossible. This invention has shown a novel field of application of the cold forging method which may include many objects other than the planet carriers specifically disclosed.

It should be understood, therefore, that the foregoing disclosure relates to only a preferred embodiments of the invention, and that it is intended to cover all changes and modifications of the example of the invention herein chosen for the purpose of the disclosure which do not constitute departures from the spirit and scope of the invention set forth in the appended claims.

What is claimed is:

1. A planet carrier for the planetary gear of a multiple speed bicycle hub and the like comprising:
   (a) a substantially circular flange member;
   (b) a bearing sleeve member coaxial with said flange member and projecting therefrom in one axial direction; and
   (c) a plurality of pin-shaped projections spaced from said sleeve member and extending from said flange member in both axial directions, the projections extending in one of said axial directions constituting bearing means for the planet wheels of said planetary gear, said flange member, bearing sleeve member, and projections constituting a unitary metal structure having flow lines in the metal of said structure, said flow lines conforming to the external shape of said structure.

2. A planet carrier as set forth in claim 1, further comprising a pawl pivotally mounted on one of said projections extending in the other axial direction.

3. A planet carrier as set forth in claim 1, wherein one of said projections decreases stepwise in cross section in a direction axially away from said flange member.

4. A planet carrier as set forth in claim 1, wherein said metal is steel.

References Cited in the file of this patent

UNITED STATES PATENTS

| | | |
|---|---|---|
| 1,277,070 | Harrison | Aug. 27, 1918 |
| 2,644,339 | Kamplade | July 7, 1953 |
| 2,759,257 | Schlegel | Aug. 21, 1956 |
| 2,994,952 | Klooz | Aug. 8, 1961 |
| 3,021,728 | Shimano | Feb. 20, 1962 |
| 3,034,618 | Dotter et al. | May 15, 1962 |
| 3,071,986 | Schwerdhofer | Jan. 8, 1963 |